UNITED STATES PATENT OFFICE.

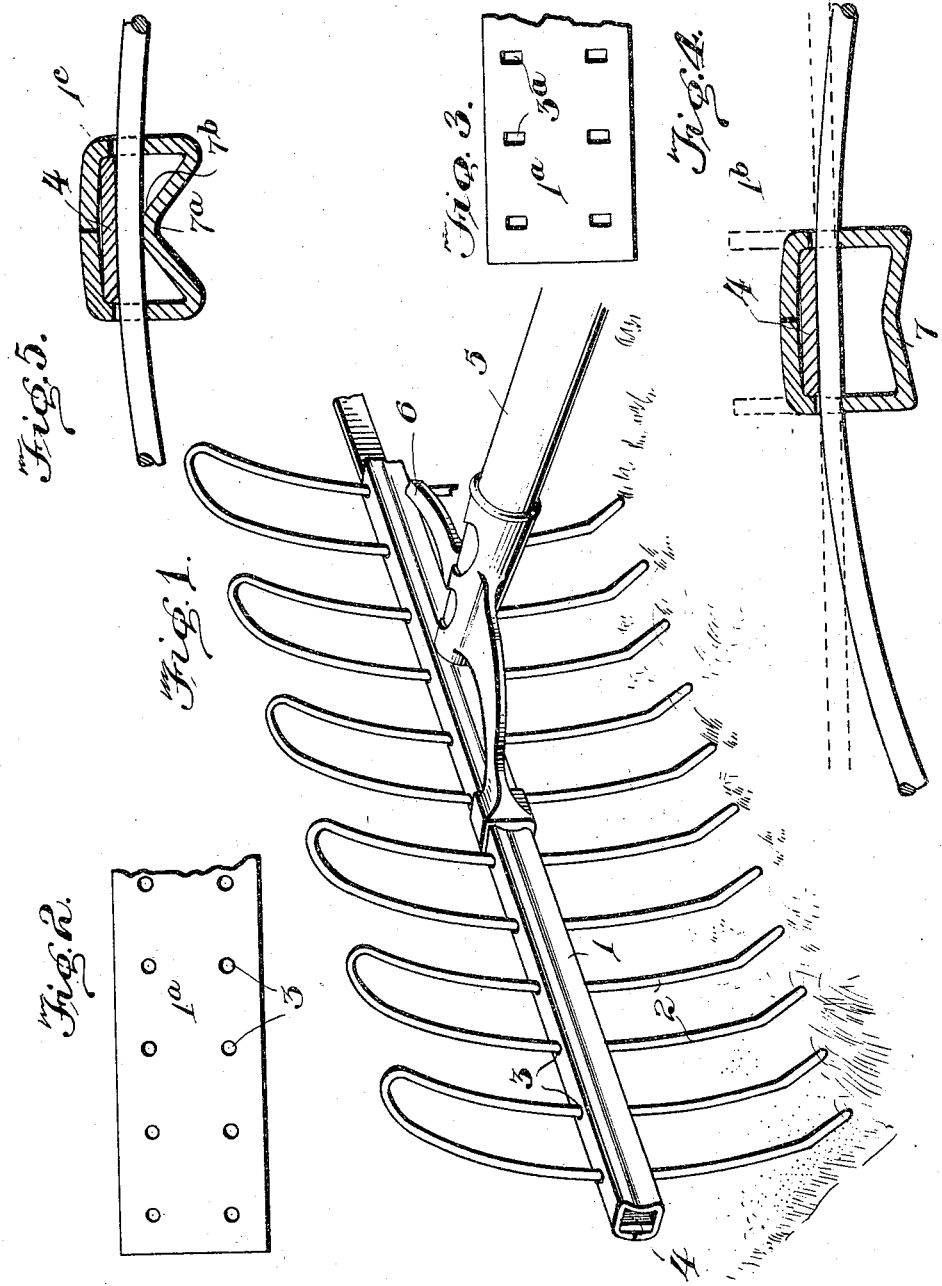

FREDERICK E. KOHLER, OF CANTON, OHIO, ASSIGNOR TO THE F. E. KOHLER COMPANY, OF CANTON, OHIO, A CORPORATION OF OHIO.

RAKE.

1,263,255.  Specification of Letters Patent.  Patented Apr. 16, 1918.

Application filed September 27, 1915. Serial No. 52,761.

*To all whom it may concern:*

Be it known that I, FREDERICK E. KOHLER, a citizen of the United States, residing at Canton, in the county of Stark and State of Ohio, have invented certain new and useful Improvements in Rakes, of which the following is a specification.

The invention relates to improvements in lawn rakes of the type in which a tubular rake head is formed from a blank sheet of metal and provided with series of apertures for receiving and holding rake teeth made of wire; and the objects of the invention are to provide a construction which will permit the wire for the teeth to be freely entered endwise into the apertures, and improved means for firmly and positively clamping the rake teeth in the head so that they will not slip out of position when the rake is subjected to severe usage.

Heretofore the teeth have been held in such a rake head by an engagement with the edges of neatly fitting apertures, such engagement being effected during the formation of the head by bending the sides of a U-shaped or channel bar to form the tubular head, whereby the teeth are gripped by the edges of the apertures; as more fully set forth in Patent No. 567,129, dated September 8, 1896.

Such a construction requires the teeth to fit the apertures so neatly that power pressure is necessary to force the teeth into the same; and furthermore, it has been found in practice, that the engaging contact between the teeth and rake head, thus effected, is not always sufficient to securely hold the teeth in their proper positions.

These difficulties are overcome in the present invention by forming the rake head with series of apertures, of sufficient size to permit the wire for the teeth to be readily inserted endwise therein, and by providing a retainer or binder extending transversely of the teeth and held in clamping engagement therewith by the walls of the head, thus insuring that the teeth will not only positively engage the edges of the apertures, but will be held in engagement therewith by the pressure of the binder against a considerable portion of the surface of the teeth.

A preferred embodiment of the invention is illustrated in the accompanying drawings, forming part hereof, in which—

Figure 1 is a fragmentary perspective view of the completed rake;

Fig. 2, a fragmentary elevation of the blank sheet of metal from which the rake head is formed, showing one form of apertures therein;

Fig. 3, a similar view showing another form of apertures;

Fig. 4, a fragmentary elevation section through the rake head showing the manner in which the teeth are gripped and held in position; and Fig. 5, a fragmentary elevation section showing a modified form of rake head.

Similar numerals refer to similar parts throughout the drawings.

The rake is composed of a tubular head 1 having a plurality of teeth 2 inserted through series of apertures 3 therein, and held in position in said apertures by means of a binder 4. A handle 5 is suitably connected to the head 1 by means of a yoke 6 in the usual manner.

The head 1 is formed from a blank sheet of metal 1ª by suitable dies (not shown), said blank being provided with pairs of alined apertures 3 which may be in the form of perforations, as shown; and these apertures are so positioned in the blank that they are brought into alinement with each other when the blank is bent into U-form. The apertures are preferably made slightly larger than the wire for the rake teeth 2, thus permitting the teeth to be readily inserted endwise therein by manual means.

The binder 4 is formed from a strip of sheet metal of substantial thickness, and corresponds in length to the length of the head and in width to the interior dimensions of the head. When placed in position in the head, the binder thus extends over and across the rake teeth 2 inserted through the apertures 3, and is held in engagement therewith by the walls of the head, as will be presently described.

In the formation of the rake head, the metal blank 1ª is first bent into U-form to bring the aperture 3 of one series into alinement with the apertures of the other series, and the rake teeth entered in the apertures, as shown in dotted lines in Fig. 4. The binder 4 is then placed upon and across the teeth between the side walls 1ᵇ of the U-form, and is then forced into contact with the rake teeth and held in clamping engagement therewith by the side walls 1ᵇ of the U-form as they are bent inward and downward in the completing operation of forming the head. In this operation the upper longitudinal edges of the binder are engaged by the inner faces of the walls at a point immediately above the aperture 3, and by reason of the leverage thus obtained, the binder is forced against the teeth, and in turn causes the teeth to firmly grip the lower edges of the apertures and be positively held in engagement therewith.

It will thus be evident that by my improved construction, the rake teeth may, if desired, be manually inserted through the apertures in the rake head, and are positively held from slipping out of position when the rake is subjected to violent usage, by the binder 4, which is forced against the teeth by the walls of the head, and in turn causes the teeth to engage with the opposite edges of the apertures.

After the teeth have thus been secured in position, they may be curved into any desired final form by placing the head between a pair of suitable dies (not shown); and, if desired, a groove 7 may be formed in the lower wall of the tubular head for the purpose of adding strength and rigidity thereto.

In Fig. 5 I have illustrated a modified form of head 1ᶜ having a strengthening groove 7ᵃ in its under side, said groove forming a rib 7ᵇ on the interior of the head which engages with the under side of the teeth, and thus forms an additional binding surface therefor.

I claim:

Rake construction comprising a tubular head having pairs of alined apertures therein, teeth loosely entered endwise in the apertures, and a binder strip of substantial thickness extending across the teeth the full width of the space between the walls of the head, the walls of the head immediately above the apertures being bent inward and downward upon the binder to clamp the edges thereof against the teeth for gripping the teeth against the inner edges of the apertures.

FREDERICK E. KOHLER.